(12) United States Patent
Matsuda et al.

(10) Patent No.: US 9,318,765 B2
(45) Date of Patent: Apr. 19, 2016

(54) SOLID ELECTROLYTE MEMBRANE, FUEL BATTERY CELL, AND FUEL BATTERY

(75) Inventors: Motofumi Matsuda, Kobe (JP); Tadatoshi Murota, Kobe (JP); Tatsuya Takeguchi, Sapporo (JP); Wataru Ueda, Sapporo (JP)

(73) Assignees: SANTOKU CORPORATION, Kobe-shi (JP); National University Corporation Hokkaido University, Sapporo-shi (JP)

( * ) Notice: Subject to any disclaimer, the term of this patent is extended or adjusted under 35 U.S.C. 154(b) by 567 days.

(21) Appl. No.: 13/582,287

(22) PCT Filed: Mar. 1, 2011

(86) PCT No.: PCT/JP2011/054596
§ 371 (c)(1),
(2), (4) Date: Aug. 31, 2012

(87) PCT Pub. No.: WO2011/108526
PCT Pub. Date: Sep. 9, 2011

(65) Prior Publication Data
US 2012/0328971 A1    Dec. 27, 2012

(30) Foreign Application Priority Data

Mar. 2, 2010 (JP) .................. 2010-045778

(51) Int. Cl.
*H01M 8/10* (2006.01)
*H01M 8/12* (2006.01)
(Continued)

(52) U.S. Cl.
CPC ............ *H01M 8/1246* (2013.01); *H01M 4/881* (2013.01); *H01M 4/92* (2013.01);
(Continued)

(58) Field of Classification Search
None
See application file for complete search history.

(56) References Cited

U.S. PATENT DOCUMENTS

| 7,344,791 B1 * | 3/2008 | Yamaguchi et al. .......... 429/492 |
| 2002/0012825 A1 * | 1/2002 | Sasahara et al. ................ 429/30 |

(Continued)

FOREIGN PATENT DOCUMENTS

| EP | 2 190 047 A1 | 5/2010 |
| JP | 2004-185882 A | 7/2004 |

(Continued)

OTHER PUBLICATIONS

International Searching Authority, Translation of the Written Opinion of the International Searching Authority issued in corresponding International Application No. PCT/JP2011/054596, dated May 24, 2011.

(Continued)

*Primary Examiner* — Ula C Ruddock
*Assistant Examiner* — Matthew Van Oudenaren
(74) *Attorney, Agent, or Firm* — Sughrue Mion, PLLC

(57) ABSTRACT

Provided are a solid electrolyte membrane useful in achieving strong electromotive force in a fuel battery, and a fuel battery cell produced with this membrane. The solid electrolyte membrane includes a substrate made of a sheet material and having a plurality of openings penetrating the substrate in its thickness direction, and a solid electrolyte layer provided on at least one of the faces of the substrate. The fuel battery cell includes a solid electrolyte membrane having the solid electrolyte layer on one of the faces of the substrate, and a catalyst layer containing a precious metal and provided on the other of the faces of the substrate, with the solid electrolyte layer and the catalyst layer being in contact with each other in the openings of the substrate.

7 Claims, 7 Drawing Sheets

(51) Int. Cl.
  *H01M 4/88* (2006.01)
  *H01M 4/92* (2006.01)

(52) U.S. Cl.
  CPC ............. *H01M 8/1213* (2013.01); *H01M 8/10* (2013.01); *H01M 8/12* (2013.01); *H01M 2008/1293* (2013.01); *Y02E 60/521* (2013.01); *Y02E 60/525* (2013.01); *Y02P 70/56* (2015.11)

(56) References Cited

U.S. PATENT DOCUMENTS

| | | | |
|---|---|---|---|
| 2005/0181253 A1* | 8/2005 | Finnerty et al. | 429/30 |
| 2006/0068258 A1* | 3/2006 | Kinoshita | 429/33 |
| 2009/0068373 A1 | 3/2009 | Lee et al. | |
| 2011/0143259 A1* | 6/2011 | Ueda et al. | 429/495 |

FOREIGN PATENT DOCUMENTS

| | | |
|---|---|---|
| JP | 2005-216769 A | 8/2005 |
| JP | 2007-005126 A | 1/2007 |
| JP | 2007-035435 A | 2/2007 |
| JP | 2009-064777 A | 3/2009 |
| WO | 00/54351 A1 | 9/2000 |
| WO | 2010/007949 A1 | 1/2010 |
| WO | WO2010007949 * | 1/2010 |

OTHER PUBLICATIONS

Hiroshi Watanabe, et al., "So-jo Perovskite Fukugo Sankabutsu o Mochiita Shinki Nenryo Denchi Denkaishitsu no Tokusei Hyoka", The Electrochemical Society of Japan Dai 76 Kai Taikai Koen Yoshishu, Mar. 29, 2009, pp. 436.

Tatsuya Takeguchi, et al., "Anion Dendo So-jo Sankabutsu o Denkaishitsu to suru Nenryo Denchi no Hatsuden Tokusei", The Electrochemical Society of Japan Dai 76 Kai Taikai Koen Yoshishu, Mar. 29, 2009, pp. 457.

European Patent Office; European Search Report issued in corresponding European Application No. 11 750 636.0, dated Mar. 6, 2014.

* cited by examiner

SOLID ELECTROLYTE MEMBRANE, FUEL BATTERY CELL, AND FUEL BATTERY

CROSS REFERENCE TO RELATED APPLICATIONS

This application is a National Stage of International Application No. PCT/JP2011/054596 filed Mar. 1, 2011, claiming priority based on Japanese Patent Application No. 2010-045778, filed Mar. 2, 2010, the contents of all of which are incorporated herein by reference in their entirety.

FIELD OF ART

The present invention relates to solid electrolyte membranes, fuel battery cells, and methods of producing these. The present invention also relates to fuel batteries having the fuel battery cell.

BACKGROUND ART

Patent Publication 1 discloses an invention relating to a fuel battery containing a layered metal oxide $NaCo_2O_4$ as a solid electrolyte. The object of this invention is to obtain strong electromotive force even at about 20 to 80° C., i.e., such low temperatures as from about room temperature, without using deleterious substances or platinum.

Patent Publication 1 teaches that a solid electrolyte layer of less than 0.3 mm thick tends to be insufficient in strength. In the Examples of this publication, samples having a solid electrolyte layer formed in the thickness of about 1 mm were used to fabricate fuel batteries, and their electromotive force was evaluated. As can be seen from the current-voltage curve shown in FIG. 6 of the publication, the open circuit voltage (OCV) at the operation temperature of 75° C. was about 0.68V, and the current density was measured only up to 30 mA/cm$^2$.

Practical use of such fuel batteries with the solid electrolyte layer requires reduced internal resistance of the solid electrolyte layer by making it thinner than the conventional ones. On the other hand, in order to bring out full performance of fuel batteries, the solid electrolyte layer needs to be dense.

PRIOR ART PUBLICATIONS

Patent Publication
Patent Publication 1: WO 2010/007949

SUMMARY OF THE INVENTION

It is an object of the present invention to provide a solid electrolyte membrane useful in achieving strong electromotive force and excellent current-voltage characteristics of fuel batteries, as well as a fuel battery cell with this membrane, and methods for producing these.

It is another object of the present invention to provide a solid electrolyte membrane which is useful in achieving strong electromotive force and excellent current-voltage characteristics of fuel batteries, in particular, which inhibits voltage drop and has excellent load characteristics, as well as a fuel battery cell with this membrane, and methods for producing these.

The present inventors have made intensive researches in the technology of forming a solid electrolyte membrane with its denseness maintained, to find out that a solid electrolyte membrane may be made extremely thinner than the conventional ones with its mechanical strength maintained, by employing a substrate of a particular structure. By the use of a solid electrolyte membrane of such a structure in a fuel battery, the present inventors could achieve sufficiently high open circuit voltage (OCV) and excellent current-voltage characteristics, to thereby complete the present invention.

According to the present invention, there is provided a solid electrolyte membrane comprising a substrate made of a sheet material and having a plurality of openings penetrating the substrate in its thickness direction, and a solid electrolyte layer provided on at least one of the faces of said substrate.

By using this substrate, the internal resistance of the solid electrolyte membrane may be kept low, while the mechanical strength of the dense solid electrolyte membrane may be improved.

According to the present invention, there is also provided a method for producing a solid electrolyte membrane comprising the steps of:

preparing a slurry comprising solid electrolyte powder, a binder, and a solvent;

applying said slurry to at least one of the faces of a substrate made of a sheet material and having a plurality of openings penetrating the substrate in its thickness direction; and drying and/or baking said substrate with the slurry applied.

According to the present invention, there is also provided a fuel battery cell comprising the solid electrolyte membrane mentioned above according to the present invention, and a catalyst layer comprising a precious metal, wherein the solid electrolyte layer is provided on one of the faces of the substrate, and said catalyst layer is provided on the other of the faces of the substrate, with the solid electrolyte layer and the catalyst layer being in contact with each other in the openings of the substrate.

According to the present invention, there is further provided a fuel battery cell comprising the solid electrolyte membrane mentioned above according to the present invention, and a catalyst layer comprising a precious metal, wherein the solid electrolyte layer is provided on each of the faces of the substrate, with the solid electrolyte of the two layers being in contact with each other in the openings of the substrate, and wherein said catalyst layer is laminated on one of the solid electrolyte layers in direct contact therewith.

According to the present invention, there is also provided a method for producing a fuel battery cell comprising the steps of:

preparing a first slurry comprising solid electrolyte powder, a binder, and a solvent;

preparing a second slurry comprising precious metal-carrying catalyst powder and a solvent;

applying said first slurry to one of the faces of a substrate made of a sheet material and having a plurality of openings penetrating the substrate in its thickness direction;

drying and/or baking the substrate with the first slurry applied to form a solid electrolyte layer on said one of the faces;

applying said second slurry to the other of the faces of the substrate without the solid electrolyte layer; and drying and/or baking the substrate with the second slurry applied to form a catalyst layer on said the other of the faces.

According to the present invention, there is further provided a method for producing a fuel battery cell comprising the steps of:

preparing a first slurry comprising solid electrolyte powder, a binder, and a solvent;

preparing a second slurry comprising precious metal-carrying catalyst powder and a solvent;

applying said first slurry to each of the faces of a substrate made of a sheet material and having a plurality of openings penetrating the substrate in its thickness direction;

drying and/or baking the substrate with the first slurry applied to form a solid electrolyte layer on said each of the faces;

applying said second slurry to one of the faces of the substrate having the solid electrolyte layer formed thereon; and drying and/or baking the substrate with the second slurry applied to form a catalyst layer on the solid electrolyte layer on the substrate.

According to the present invention, there is also provided a fuel battery comprising the above-mentioned fuel battery cell.

In the present invention, the solid electrolyte layer may preferably contain one of the metal oxides selected from the group consisting of $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, and $Sr_4Co_{1.6}Ti_{1.4}O_8(OH)_2 \cdot xH_2O$. These metal oxides develop superior hydroxide ion conductivity when subjected to reduction-hydration treatment. In this case, the catalyst layer may also preferably contain these metal oxides, on which precious metal is carried. When both the solid electrolyte layer and the catalyst layer contain the same kind of metal oxide, the interface between the two can be continuous, which causes sufficiently low internal resistance of a laminate of the solid electrolyte layer and the catalyst layer.

For a solid oxide fuel cell (SOFC), the solid electrolyte layer may preferably contain yttria-stabilized zirconia in view of heat resistance and oxygen ion conductivity at high temperatures.

According to the present invention, the solid electrolyte membrane, employing the particular substrate with a plurality of openings as a structural member, may be made thinner than the conventional ones, with its mechanical strength maintained, and its solid electrolyte layer may be given low internal resistance with its denseness maintained, so that a fuel battery having a sufficiently strong electromotive force may be produced.

EMBODIMENTS OF THE INVENTION

Figure 1:
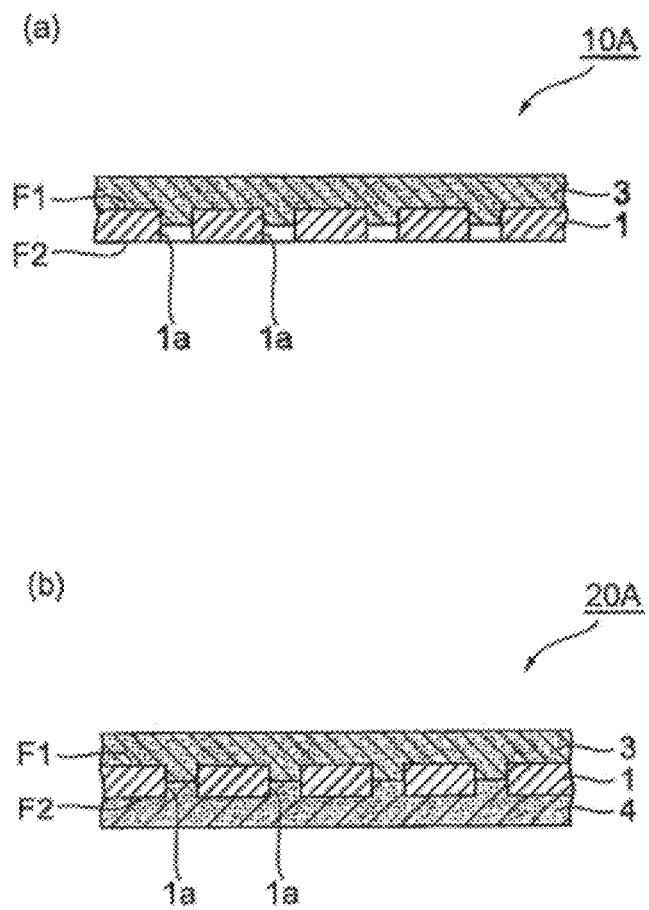
FIG. 1(a) is a schematic sectional view of a first embodiment of the solid electrolyte membrane according to the present invention.
FIG. 1(b) is a schematic sectional view of a fuel battery cell having the solid electrolyte membrane of FIG. 1(a).

Preferred embodiments of the present invention will now be explained below with reference to the attached drawings in some instances, wherein the same or corresponding parts are referred to by the same reference signs without redundant explanation, and the dimensional ratio are not limited to as shown in the drawings.

[Solid Electrolyte Membrane]

First Embodiment

Solid electrolyte membrane 10A shown in FIG. 1(a) includes substrate 1 made of a sheet material and having a plurality of openings 1a penetrating the substrate in its thickness direction, and solid electrolyte layer 3 formed on one of the faces F1 of the substrate 1 and filling at least partly the openings 1a. Fuel battery cell 20A shown in FIG. 1(b) is fabricated by providing catalyst layer 4 on the face F2 of the solid electrolyte membrane 10A without the solid electrolyte layer 3.

The substrate 1 is made of a sheet material, which improves the strength of the solid electrolyte membrane 10A. The substrate 1 may preferably be a metal substrate having a function of imparting mechanical strength.

Examples of the material of the substrate 1 may include nickel, nickel-plated products, heat-resistant nickel alloys, nickel-chromium alloys, stainless steel, iron-chromium alloys, and aluminum. Suitable one of these may be selected depending on the operating temperature. For example, in case the heat resistance is required, a highly heat resistant material may be selected. Synthetic resins, such as plastics, may also be used as substrate 1, instead of the metal substrates, which have electrical conductivity.

The substrate 1 has a plurality of openings 1a penetrating the substrate in its thickness direction. By providing a plurality of openings 1a, the contact portion between the solid electrolyte layer 3 and the catalyst layer 4 in each of the openings 1a independently functions as a fuel battery, so that the cell as a whole can be regarded as parallel fuel batteries (see FIG. 1(b)).

The substrate 1 may be a metal substrate, such as punched metal, metal mesh, or expanded metal (See FIGS. 5 and 6), with punched metal being particularly preferred for its capability of facilitating improvement of solid electrolyte density. The shape of the openings of the punched metal may be circular, rectangular, elongate, or the like, without particular limitation. Similarly, the shape of the openings of the mesh may be various shapes without particular limitation.

The average pore size of the plurality of openings 1a may preferably be 5 to 80 μm, more preferably 10 to 70 μm, most preferably 25 to 60 μm. With an average pore size of less than 5 μm, the conducting path for hydroxide ions is small, and the solid electrolyte is hard to fill the openings to result in reduced points of contact with the catalyst layer, likely causing insufficient electricity generation performance. On the other hand, with an average pore size of over 80 μm, the mechanical strength of the solid electrolyte membrane 10A tends to be insufficient, and problems such as exfoliation of the solid electrolyte layer may occur.

As used herein, the pore size of the openings means, for circular openings, the diameter of the openings; for rectangular openings, the longer of the two diagonals each connecting two of the vertices of the rectangle; and for elongate openings, the longer diameter in the longitudinal direction. For mesh, the pore size is the longer of the diagonals each connecting two of the vertices of the rectangle forming the mesh.

The porosity of the substrate 1 prior to formation of the solid electrolyte layer thereon is preferably 20 to 75%, more preferably 25 to 60%, still more preferably 28 to 50%. With a porosity of less than 20%, the conducting path for hydroxide ions is small, and the solid electrolyte is hard to fill the openings to result in reduced points of contact with the catalyst layer, likely causing insufficient electricity generation performance. On the other hand, with a porosity of over 75%, the mechanical strength of the solid electrolyte membrane 10A tends to be insufficient, and problems such as exfoliation of the solid electrolyte layer may occur.

As used herein, the porosity means a value calculated with the following formula, wherein A denotes the area of one of the faces of the substrate 1 (including the area of the openings 1$a$), and B denotes the total area of the plurality of openings 1$a$:

Porosity(%)=$B/A \times 100$

The average thickness of the substrate 1 is preferably 18 to 80 μm, more preferably 20 to 75 μm, still more preferably 25 to 70 μm. By forming the solid electrolyte membrane 10A in a film form using such substrate 1, the resistance in the solid electrolyte is reduced, and the hydroxide ion conductivity is improved. With substrate 1 having an average thickness of less than 18 μm, the mechanical strength of the solid electrolyte membrane 10A tends to be insufficient, whereas with over 80 μm, the resistance in the solid electrolyte tends to be high.

For preventing exfoliation of and securing the contact area between the solid electrolyte layer 3 and the catalyst layer 4, the solid electrolyte layer 3 is preferably provided so as to fill the openings 1$a$ of the substrate 1 at least partially, as shown in FIGS. 1($a$) and 1($b$). Alternatively, the solid electrolyte layer 3 may fully fill the openings 1$a$ of the substrate 1 to be flush with the face F2 of the substrate 1.

The solid electrolyte layer 3 preferably contains a metal oxide. In this case, the metal oxide employed as an electrolyte material is preferably those developing hydroxide ion conductivity upon reduction-hydration treatment. Among such materials, a metal oxide selected from the group consisting of $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, and $Sr_4Co_{1.6}Ti_{1.4}O_8(OH)_2 \cdot xH_2O$ is preferred for achieving strong electromotive force. These materials may be formed into a layered structure by, for example, a solid-phase reaction. As used herein, a "layered" structure means a crystal structure wherein atoms or atomic groups are arranged on a particular plane to form a sheet structure, and repetition of this sheet structure is observed perpendicular to this plane.

$NaCo_2O_4$ may be obtained, for example, as follows. A solution prepared by dissolving sodium acetate and cobalt acetate tetrahydrate at a particular ratio is dried, and the resulting specimen is ground and pre-baked. The pre-baked specimen is ground, then formed into pellets, and baked again at about 750 to 850° C. The baked pellets are then ground to thereby obtain $NaCo_2O_4$ having a layered crystal structure.

$LaFe_3Sr_3O_{10}$ is a layered perovskite oxide. $LaFe_3Sr_3O_{10}$ may be obtained, for example, by placing and processing particular amounts of lanthanum oxide, strontium carbonate, and iron oxide in a ball mill into a sufficiently uniform mixture. The resulting specimen is formed into pellets, baked at about 1400 to 1500° C., and ground to thereby obtain $LaFe_3Sr_3O_{10}$ having a layered crystal structure.

$Bi_4Sr_{14}Fe_{24}O_{56}$ may be obtained, for example, by placing and processing particular amounts of bismuth oxide, strontium oxide, and iron oxide in a ball mill into a sufficiently uniform mixture. The resulting specimen is formed into pellets, baked at about 1100 to 1200° C., and ground to thereby obtain $Bi_4Sr_{14}Fe_{24}O_{56}$ having a layered crystal structure.

$NaLaTiO_4$ may be obtained, for example, by placing and processing particular amounts of lanthanum oxide, titanium oxide, and sodium carbonate in a ball mill into a sufficiently uniform mixture. The resulting specimen is formed into pellets, baked at about 700 to 750° C., and successively at 900 to 950° C. The baked pellets were ground, washed with distilled water, and dried at 120° C. to thereby obtain $NaLaTiO_4$ having a layered crystal structure.

$RbLaNb_2O_7$ may be obtained, for example, by placing and processing particular amounts of lanthanum oxide, rubidium carbonate, and niobium oxide in a ball mill into a sufficiently uniform mixture. The resulting specimen is formed into pellets, and baked at about 1100 to 1200° C. The baked pellets were ground, washed with distilled water, and dried at 120° C., to thereby obtain $RbLaNb_2O_7$ having a layered crystal structure.

$KLaNb_2O_7$ may be obtained, for example, by placing and processing particular amounts of lanthanum oxide, potassium carbonate, and niobium oxide in a ball mill into a sufficiently uniform mixture. The resulting specimen is formed into pellets, and baked at about 1100 to 1200° C. The baked pellets were ground, washed with distilled water, and dried at 120° C., to thereby obtain $KLaNb_2O_7$ having a layered crystal structure.

$Sr_4Co_{1.6}Ti_{1.4}O_8(OH)_2 \cdot xH_2O$ may be obtained, for example, by placing and processing particular amounts of strontium carbonate, cobalt oxide, and titanium oxide in a ball mill into a sufficiently uniform mixture. The resulting specimen is formed into pellets, baked at about 1275 to 1375° C., and ground to thereby obtain $Sr_4Co_{1.6}Ti_{1.4}O_8(OH)_2 \cdot xH_2O$ having a layered crystal structure.

Powdered $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, or $Sr_4Co_{1.6}Ti_{1.4}O_8(OH)_2 \cdot xH_2O$, each having a layered crystal structure, may be prepared into a slurry, from which the solid electrolyte layer 3 may be formed. Incidentally, the solid electrolyte layer 3 may contain oxides other than $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, and $Sr_4Co_{1.6}Ti_{1.4}O_8(OH)_2 \cdot xH_2O$ or impurities, to the extent that the exhibition of the functions of the metal oxide is not inhibited.

The solid electrolyte membrane 10A may be fabricated by a method including the steps of preparing a slurry for forming a solid electrolyte layer containing solid electrolyte powder, a binder, and a solvent (first slurry), applying the slurry over the face F1 of the substrate 1, and drying and/or baking the substrate 1 with the slurry applied. More specifically, for example, metal oxide powder is mixed with a suitable binder, a solvent which dissolves the binder is added, and the mixture is stirred sufficiently into a slurry, with optional use of a homogenizer or the like, if necessary. The slurry obtained through the stirring is applied to the substrate 1 in the thickness of not more than 300 μm (including the substrate thickness) by means of a doctor blade and/or a sprayer. The application may be made once or a plurality of times as long as a desired thickness is achieved. By applying the slurry a plurality of times, the density of the solid electrolyte layer may be improved, and the voltage drop may be inhibited.

After the substrate with the slurry is left to stand for not less than 30 minutes following the application, the slurry is dried at 60 to 100° C. for 1 minute to 20 hours in the air. In this case, if the slurry is left to stand for too short a time, or dried at too high a temperature, the solvent in the slurry may foam, resulting in an uneven thickness.

Then the substrate is baked in the air. For example, when a solid electrolyte with $NaCo_2O_4$ is applied to the substrate 1, the baking is preferably carried out at a temperature of 500 to 700° C. for a holding time of 1 to 10 hours. Through the baking, the binder is mostly evaporated, which is thought to generate a number of fine voids in the baked membrane. Thus, it is preferred to press the substrate 1 and the solid electrolyte layer 3 containing the metal oxide at 40 to 60 MPa for 1 to 30 minutes to compact the solid electrolyte layer 3. In this case, the thickness of the solid electrolyte membrane 10A (the total of the thicknesses of the substrate 1 and the solid electrolyte layer 3) is preferably 30 to 200 μm, more preferably 30 to 150 μm, still more preferably 40 to 150 μm. With too small a thickness, cross leakage may occur in the solid electrolyte layer, and the OCV in the low current range may be low. With insufficient pressing, the water vapor supplied upon generation of electricity is condensed into dews in the voids of the electrolyte to cause moisture accumulation in the membrane, which inhibits gas diffusion and may impair battery performance. Further, the precious metal catalyst on the fuel electrode may be exfoliated, failing to achieve sufficient current density.

The binder may either be organic or inorganic, and may be of any material as long as it is dispersed or dissolved in a solvent together with the metal oxide powder, and binds the powder upon removal of the solvent. Examples of such a binder may include polytetrafluoroethylene, polyvinylidene fluoride, polyvinyl acetate, polymethylmethacrylate, styrene-butadiene copolymer, acrylonitrile-butadiene copolymer, carboxymethyl cellulose, polyvinyl alcohol, fluororubber, and ethylene-butadiene rubber. Examples of the solvent may include N-methylpyrrolidinone, tetrahydrofuran, ethylene oxide, methyl ethyl ketone, cyclohexanone, methyl acetate, methyl acrylate, dimethyl triamine, dimethylformamide, dimethylacetamide, and ethylene glycol.

The membrane may alternatively be prepared by other methods than the above-discussed method, for example, gas-phase methods including PVD (physical vapor deposition), such as vacuum vapor deposition, sputtering, ion plating, and PLD (laser ablation), and CVD (chemical vapor deposition), such as thermal CVD, plasma CVD, and MOCVD; the above-mentioned doctor blading, spin coating, sol-gel method, and spraying, without particular limitation as long as film formation is possible.

Second Embodiment

Figure 3:
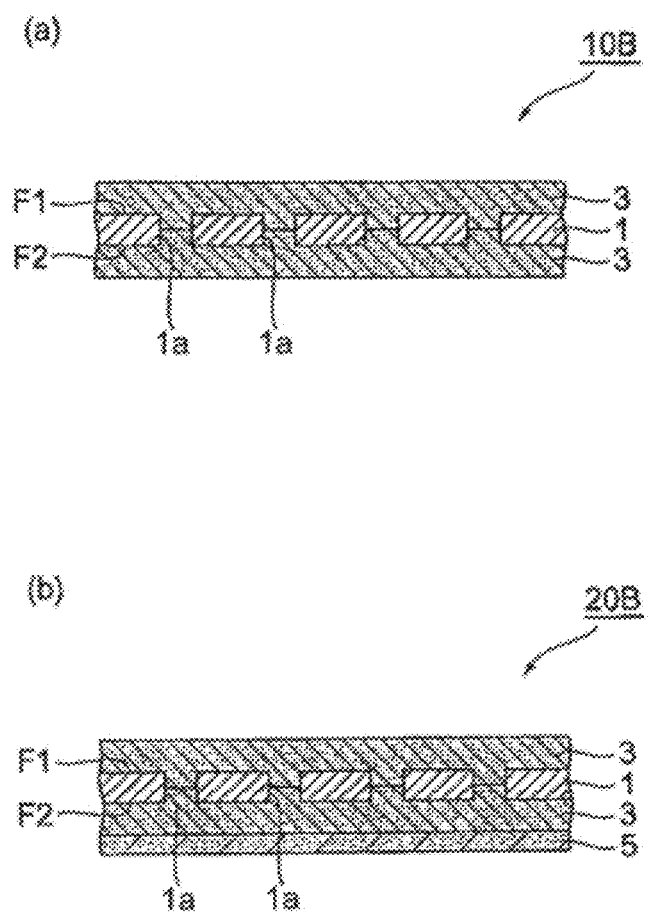
FIG. 3(a) is a schematic sectional view of a second embodiment of the solid electrolyte membrane according to the present invention.
FIG. 3(b) is a schematic sectional view of a fuel battery cell having the solid electrolyte membrane of FIG. 3(a).

Solid electrolyte membrane 10B shown in FIG. 3(a) differs from the solid electrolyte membrane 10A according to the first embodiment in that the solid electrolyte layer 3 is disposed also on face F2 of the substrate 1. As can be seen from FIG. 3(a), the openings 1a of the substrate 1 are filled with the solid electrolyte.

The solid electrolyte membrane 10B may be fabricated by a method including the steps of preparing a slurry for forming a solid electrolyte layer containing solid electrolyte powder, a binder, and a solvent (first slurry), applying the slurry over each of the faces F1, F2 of the substrate 1, and drying and/or baking the substrate 1 with the slurry applied.

Then the substrate is baked in the air. For example, when a solid electrolyte with $NaCo_2O_4$ is applied to each of the faces of the substrate 1, the baking is preferably carried out at a temperature of 500 to 700° C. for a holding time of 1 to 10 hours. When $NaCo_2O_4$ is used, the substrate is preferably baked with, for example, $Na_2CO_3$ applied over the upper and lower faces of the solid electrolyte membrane for preventing evaporation of Na and inhibiting generation of $Co_3O_4$ to keep the solid electrolyte layer dense.

Through the baking, the binder is mostly evaporated, which is thought to generate a number of fine voids in the baked membrane. Thus, it is preferred to press the substrate 1 and the solid electrolyte layer 3 containing the metal oxide at 40 to 60 MPa for 1 to 30 minutes to compact the solid electrolyte layer 3. If the pressing is insufficient, the water vapor supplied upon generation of electricity is condensed into dews in the voids of the electrolyte to cause moisture accumulation in the membrane, which inhibits gas diffusion and may impair battery performance. Further, the precious metal catalyst on the fuel electrode may be exfoliated, failing to achieve sufficient current density.

The binder, the solvent, and the film-forming method employed in the process discussed above are identical with those employed in the first embodiment.

[Fuel Battery Cell]

First Embodiment

The fuel battery cell 20A shown in FIG. 1(b) has catalyst layer 4 on the face F2, where the solid electrolyte layer 3 is not provided, of the solid electrolyte membrane 10A. As can be seen from FIG. 1(b), the solid electrolyte layer 3 is in contact with the catalyst layer 4 in the openings 1a of the substrate 1. As mentioned above, the contact portion between the solid electrolyte layer 3 and the catalyst layer 4 in each of the openings 1a independently functions as a fuel battery so that the cell as a whole can be regarded as parallel fuel batteries. If the contact portion in one of the openings 1a fails to exhibit the battery performance for some reason, the remaining, many contact portions can maintain the battery performance of the overall cell, so that drastic improvement in durability is realized.

Fabrication of the fuel battery cell 20A starts with preparation of the solid electrolyte membrane 10A shown in FIG. 1(a), and a paste or slurry for forming the catalyst layer, containing catalyst powder carrying a precious metal, a solvent, and optionally a binder (referred to as the second slurry).

The catalyst powder may be prepared as follows. The precious metal may be Pt, Pd, Ru, Ag, or the like. When Pd is used for example, a $Pd(NH_3)_2(NO_2)_2$ nitric acid solution is added to the metal oxide powder obtained above, which is then impregnated on a water bath, and the moisture is evaporated until powder is obtained. The resulting specimen is placed in a furnace and baked in the air. For example, when the metal oxide is $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, or $Sr_4Co_{1.6}Ti_{1.4}O_8(OH)_2 \cdot xH_2O$, the baking is preferably carried out at a temperature of 500 to 700° C. for a holding time of 1 minute to 20 hours. In this way, a Pd-carrying metal oxide catalyst carrying 12 to 15 mass % Pd based on the mass of the metal oxide is obtained.

Next, the Pd-carrying metal oxide and a solvent are thoroughly kneaded, and a binder is optionally added, to thereby prepare a paste (slurry) containing these components. The obtained paste is applied, in the thickness of 10 to 30 μm, to the substrate on the face opposite to the face on which the solid electrolyte layer has been formed. The substrate with the paste applied is then dried, and baked in the air, to obtain a fuel battery cell. For example, when the metal oxide is $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, or $Sr_4Co_{1.6}Ti_{1.4}O_8(OH)_2 \cdot xH_2O$, the drying of the substrate with the paste applied may preferably be carried out at a temperature of 60 to 100° C. for a holding time of 1 minute to 20 hours, and the baking may preferably be carried out at a temperature of 300 to 500° C. for a holding time of 30 minutes to 5 hours.

In this way, the fuel battery cell 20A may be obtained by applying the paste or slurry for forming a catalyst layer on the face F2 of the solid electrolyte membrane 10A, and drying and/or baking the solid electrolyte membrane 10A with the slurry applied, to thereby form the catalyst layer 4 on the face F2 (see FIG. 1(b)).

Here, the fuel battery cell 20A may optionally be compacted by pressing at 40 to 60 MPa for 1 to 30 minutes. However, only the pressing during fabrication of the solid electrolyte membrane 10A may suffice.

Second Embodiment

The fuel battery cell 20B shown in FIG. 3(b) has catalyst layer 5 formed on one of the faces of the solid electrolyte membrane 10B, such that the solid electrolyte layer 3 and the catalyst layer 5 contact with each other directly.

Fabrication of the fuel battery cell 20B starts with preparation of the solid electrolyte membrane 10B shown in FIG. 3(a), and a paste or slurry for forming the catalyst layer (second slurry) in the same way as in the first embodiment. The paste or slurry for forming the catalyst layer is applied to one of the faces of the solid electrolyte membrane 10B, and the solid electrolyte membrane 10B with the slurry applied is dried and/or baked, to thereby obtain fuel battery cell 20B. Here, the fuel battery cell 20B may optionally be compacted by pressing at 40 to 60 MPa for 1 to 30 minutes. However, only the pressing during fabrication of the solid electrolyte membrane 10B may suffice. In this fuel battery cell 20B, the boundary between the solid electrolyte layer 3 and the catalyst layer 5 as well as the contact portion between the precious metal catalyst and the solid electrolyte contributes to the reaction of the fuel battery.

When a fuel battery is fabricated using the fuel battery cell 20B, the cell 20B makes a wide contribution to the fuel battery reaction, so that improvement in the electricity generation performance may be expected.

<Fuel Battery>

Explanation is made below of a fuel battery having the fuel battery cell 20A, which explanation is also applicable to a fuel battery having the fuel battery cell 20B. Here, an embodiment is discussed wherein a fuel battery is fabricated using the fuel battery cell 20A which includes the solid electrolyte layer 3 containing $NaCo_2O_4$, and the catalyst layer 4 containing a $Pd/NaCo_2O_4$ catalyst.

Figure 2:
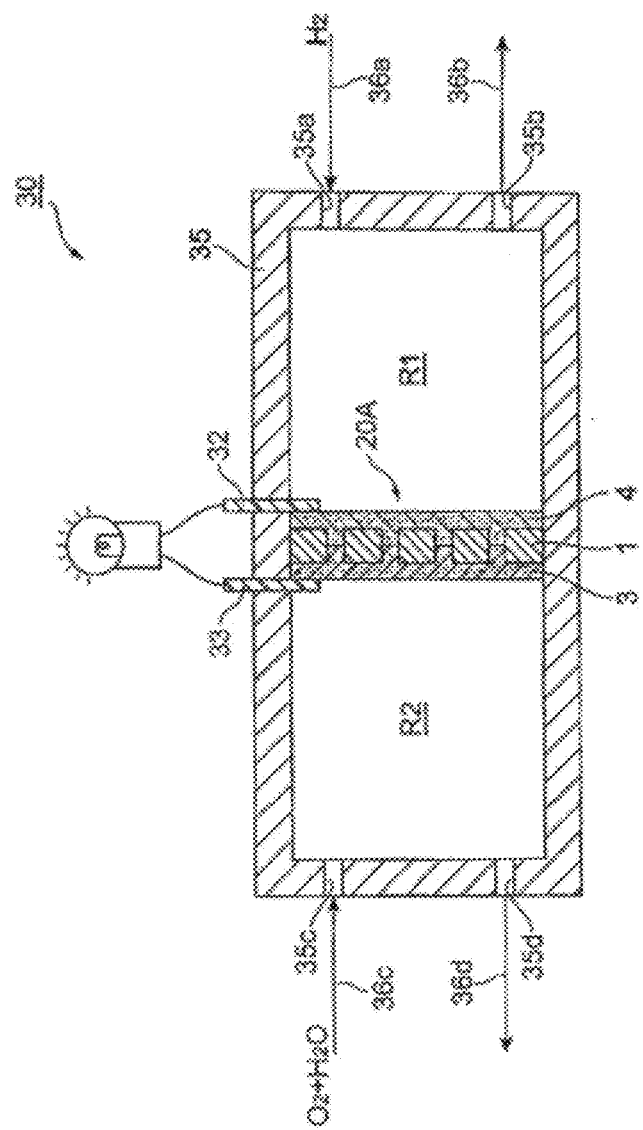
FIG. 2 is a schematic sectional view of a fuel battery equipped with the fuel battery cell shown in FIG. 1(b).

The fuel battery 30 shown in FIG. 2 has the fuel battery cell 20A of the above-mentioned structure, anode 32 and cathode 33 arranged to hold the fuel battery cell 20A therebetween, and main body 35 whose internal space is partitioned with the fuel battery cell 20A into first region R1 and second region R2.

The anode 32 is disposed on the fuel battery cell 20A on the side of the first region R1, whereas the cathode 33 is disposed on the fuel battery cell 20A on the side of the second region R2. The main body 35 accommodates the anode 32, the cathode 33, and the fuel battery cell 20A, and its internal space is partitioned with the fuel battery cell 20A into the first and second regions R1, R2. The main body 35 has gas supply port 35a for introducing hydrogen into the first region R1, and gas discharge port 35b for discharging gas from the first region R1. Conduits 36a and 36b are connected to the gas supply port 35a and the gas discharge port 35b, respectively.

A valve (not shown) or the like for regulating the gas supply rate is provided in the conduit 36a.

The main body 35 has gas supply port 35c for introducing moisture and oxygen into the second region R2, and gas discharge port 35d for discharging gas from the second region R2. Conduits 36c and 36d are connected to the gas supply port 35c and the gas discharge port 35d, respectively. A valve (not shown) or the like for regulating the gas supply rate is provided in the conduit 36c.

Lead wires connected to each of the anode 32 and the cathode 33 may be copper wire, nichrome wire, platinum wire, or the like, without any limitation to these, and may suitably be selected depending on the operating conditions.

<Electricity Generation Method>

Next, discussion is made on a method for generating electricity using the fuel battery 30. The following explanation refers to the fuel battery cell 20A, but is also applicable to a fuel battery having the fuel battery cell 20B. In order to develop hydroxide ion conductivity of the fuel battery cell 20A, $NaCo_2O_4$ constituting the solid electrolyte layer 3 needs to be subjected to reduction-hydration treatment, prior to commencement of the electricity generation by the fuel battery 30. By reducing the metal oxide constituting the solid electrolyte layer 3, oxygen vacancies are generated, and by subsequent hydration, the oxygen vacancies in the metal oxide are hydrated with water molecules following the formula (1) below. By way of this, hydroxide ion conductivity is developed. The treatment may be carried out at a hydrogen concentration of 10 to 100 vol %, a temperature of 80 to 270° C., a pressure of 0.1 to 1.0 MPa, and a processing time of 2 to 48 hours, particularly preferably at a hydrogen concentration of 100 vol %, a temperature of 250° C., a pressure of 0.1 MPa, and a processing time of 3 hours for raising the temperature up to 270° C. and 30 minutes for holding. It is further preferred that humidified hydrogen is supplied to the anode (on the catalyst face) at 5 mL/min., and the part where the sample is mounted is heated from 80 to 270° C. at a temperature raising rate of about 1.4 K/min., and then left to stand overnight for natural cooling.

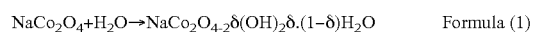

$$NaCo_2O_4 + H_2O \rightarrow NaCo_2O_{4-2\delta}(OH)_2\delta \cdot (1-\delta)H_2O \qquad \text{Formula (1)}$$

The fuel battery 30 having such a structure has the operating temperature over as wide a range of 10 to 800° C. Thus, with the fuel battery 30, sufficient electricity may be generated at a relatively low temperature, e.g., 20 to 80° C.

The preferred embodiments of the present invention have hitherto been explained in detail hereinabove, but the present invention is not limited to such embodiments. For example, an alkali fuel battery employing a metal oxide is mainly discussed as an example in the embodiments above, but a solid electrolyte membrane may be produced with yttria-stabilized zirconia (YSZ), and applied to a solid oxide fuel cell (SOFC). It is believed that, by forming a solid electrolyte layer containing yttria-stabilized zirconia (YSZ) in a film form, the internal resistance through the SOFC may be reduced, and the operating temperature (otherwise usually around 1000° C.) may be lowered.

EXAMPLES

The present invention will now be explained with reference to Examples, which do not limit the present invention. Incidentally, the following reagents were used herein, which may suitably be replaced with others:

sodium acetate ($CH_3COONa$, KANTO CHEMICAL CO., INC., special grade), cobalt acetate tetrahydrate ($(CH_3COO)_2Co \cdot 4H_2O$, WAKO PURE CHEMICAL INDUSTRIES, LTD., special grade), diammine dinitro palladium nitric acid solution ($Pd(NH_3)_2(NO_2)_2/HNO_3$, TANAKA KIKINZOKU KOGYO K.K.), ethylene glycol ($HOCH_2CH_2OH$, WAKO PURE CHEMICAL INDUSTRIES, LTD., special grade).

<Preparation of Electrolyte $NaCo_2O_4$>

Electrolyte $NaCo_2O_4$ was prepared according to the following steps (1) to (5). Incidentally, the electrolyte $NaCo_2O_4$ is prepared via a baking step as will be discussed later, wherein Na evaporates under such a high temperature condition. As such, if the starting material is prepared at the theoretical ratio (Na:Co=1:2), impurities ($Co_3O_4$) are generated in the resulting product. Thus, in the following, the molar ratio of Na to Co in the starting material was set to Na:Co=1.6:2, and the final product electrolyte $NaCo_2O_4$ was structurally analyzed.

(1) 4.00 g (48.76 mmol) of sodium acetate and 15.11 g (60.66 mmol) of cobalt acetate tetrahydrate were measured out, placed in a 200 mL Teflon (registered trademark) beaker, and dissolved in 40 g of distilled water.

(2) The solution obtained from (1) was stirred at 80° C. to evaporate the moisture, and dried in a dry oven (temperature condition: 80° C.) overnight.

(3) The dried specimen was thoroughly ground in an agate mortar, and introduced in an aluminum crucible. The crucible was placed in a muffle furnace, and the specimen was pre-baked at a temperature of 750° C. for a holding time of 5 hours in the air.

(4) The pre-baked specimen was thoroughly ground in an agate mortar, formed into pellets, and subjected to main baking at a temperature of 790° C. for a holding time of 3 hours in the air.

(5) After the main baking, the specimen was coarsely ground in an agate mortar, introduced in a planetary ball mill (FRITSCH pulverisette), and pulverized at a revolution of 300 rpm for a treatment time of 20 minutes.

<Structural Analysis of $NaCo_2O_4$>

$NaCo_2O_4$ was structurally analyzed with a powder X-ray diffractometer (Rigaku, RINT-Ultima+). The measurement conditions are as follows. As a result of the structural analysis, impurities ($Co_3O_4$) were not detected in the prepared specimen ($NaCo_2O_4$ powder).

Radiation source: CuKα
Wavelength λ: 0.154056 nm
Tube voltage: 40 kV
Current: 20 mA
Range of measurement 2θ: 2 to 80°
Scan axis: 2θ/θ
Scan step: 0.02°
Scan speed: 2°/min.
Divergence slit: ½°
Scattering slit: ½°
Receiving slit: 0.15 mm.

<Preparation of $Pd/NaCo_2O_4$ Catalyst (Carrying 15 Mass % Pd)>

1.0 g of $NaCo_2O_4$ powder (S=1 m$^2$/g) was measured out onto an evaporation dish, and 3.87 g of $Pd(NH_3)_2(NO_2)_2$ nitric acid solution (4.557 mass %) was added, which was impregnated on a water bath at 80° C., and the moisture was evaporated until powder was obtained. The resulting specimen was placed in a muffle furnace, and baked at a temperature of 600° C. for a holding time of 2 hours in the air, to thereby obtain a $Pd/NaCo_2O_4$ catalyst carrying 15 mass % Pd based on the mass of $NaCo_2O_4$ (carrier).

<Fabrication of Fuel Battery Cell>

1.2 g of $NaCo_2O_4$ powder, 1.0 g of polyvinylidene fluoride (PVDF) as a binder, and 1.3 ml of N-methylpyrrolidone (NMP) as a solvent were mixed to prepare a slurry. Here, with too little NMP, $NaCo_2O_4$ and PDVF tend to aggregate in the slurry, and may not be able to provide a uniform film.

The slurry thus obtained was applied to one of the faces of the substrate 1 in the thickness of not more than 120 μm (including the substrate thickness) by doctor-blading. After the application, the substrate with the slurry was left to stand for 30 minutes, and dried in a dry furnace at 60° C. Here, if the slurry is left to stand for too short a time, or dried at too high a temperature, the solvent in the slurry may foam, resulting in an uneven thickness. These operations were repeated suitably until a sufficiently uniform film is formed. After the drying, the substrate was baked at a temperature of 600° C. for a holding time of 5 hours in the air.

PVDF, which was used as a binder, evaporates at about 200° C., so that the solid electrolyte layer 3 obtained through the baking was assumed to have a number of fine voids inside. Thus the solid electrolyte layer 3 and the substrate 1 were pressed at a pressure of 60 MPa for 10 minutes. If the pressing is insufficient, the water vapor supplied upon generation of electricity is condensed into dews in the voids of the electrolyte to cause moisture accumulation in the membrane, which inhibits gas diffusion and may impair battery performance. Further, the catalyst carrying precious metal on the fuel electrode may be exfoliated, failing to achieve sufficient current density.

Next, 10 mg of a $Pd/NaCo_2O_4$ catalyst and 4 μL of ethylene glycol were thoroughly kneaded to prepare a slurry of these components. The slurry was applied in the thickness of about 10 to 30 μm to the face of the substrate 1 opposite to the face to which $NaCo_2O_4$ had been applied. The substrate 1 was introduced into an electric furnace, and baked at a temperature of 400° C. for a holding time of 2 hours in the air. At this stage, by regulating the baking temperature, sufficient strength may be obtained, and crystal grain growth, which decreases the contact portions for effecting the battery reaction, may be inhibited.

<Reduction-Hydration Treatment>

Prior to setting the sample fuel battery cell in an evaluation device, the cell was subjected to reduction-hydration treatment. The reduction-hydration treatment was carried out at a heating temperature of 270° C. for a holding time of 30 minutes in humidified hydrogen (3% humidification) flowing at 5 ml/min, and the treated cell was then left to stand overnight for natural cooling.

<Electricity Generation Test>

Figure 4:
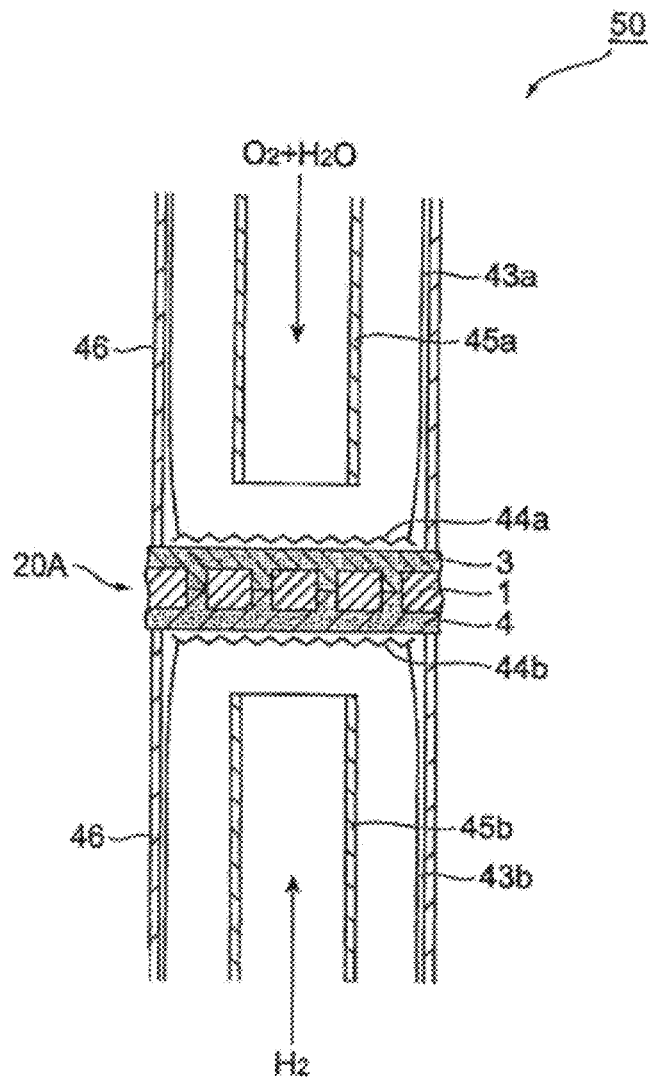
FIG. 4 is a schematic sectional view of a device for evaluating a fuel battery cell.

In order to evaluate the fuel battery performance, evaluation device 50 of the structure as shown in FIG. 4 was fabricated, and an electricity generation test was conducted on the fuel battery cell using this device.

As shown in FIG. 4, the fuel battery cell was held between Pt meshes 44a, 44b and Pt conducting wires 43a, 43b respectively connected thereto. A carbon paper may optionally be inserted between the Pt mesh 44a and the oxidant electrode (solid electrolyte layer), in which case voltage drop may be inhibited. Using a carbon paper having a solid electrolyte applied thereto in a layer, voltage drop in the lower current region may further be inhibited.

The evaluation device was fabricated such that an oxidant was supplied to an oxidant electrode (solid electrolyte layer) through feed pipe 45a, while fuel was supplied to a fuel electrode (catalyst layer) through feed pipe 45b. In other words, humidified oxygen was supplied from above to a face without a catalyst layer (cathode), while hydrogen was supplied from below to a face with a catalyst layer (anode). Incidentally, the reactive area for the gas supplied through the feedpipe 45b may be regarded as being identical with the inner cylindrical area of duct 46. The output on the Pt conducting wires 43a, 43b was measured. The measurement was made under the fuel supply treatment discussed below.

<Fuel Supply Treatment>

Hydrogen was supplied to the anode (catalyst face) at 20 mL/min. while oxygen humidified under the temperature condition of 25° C. was supplied to the cathode at 10 mL/min. While the temperature of the part where the sample was mounted was kept constant, the open circuit voltage (OCV) and the voltage with incremental load current of $5.4\,mA/cm^2$/sec. were measured.

Example 1

Figure 5:
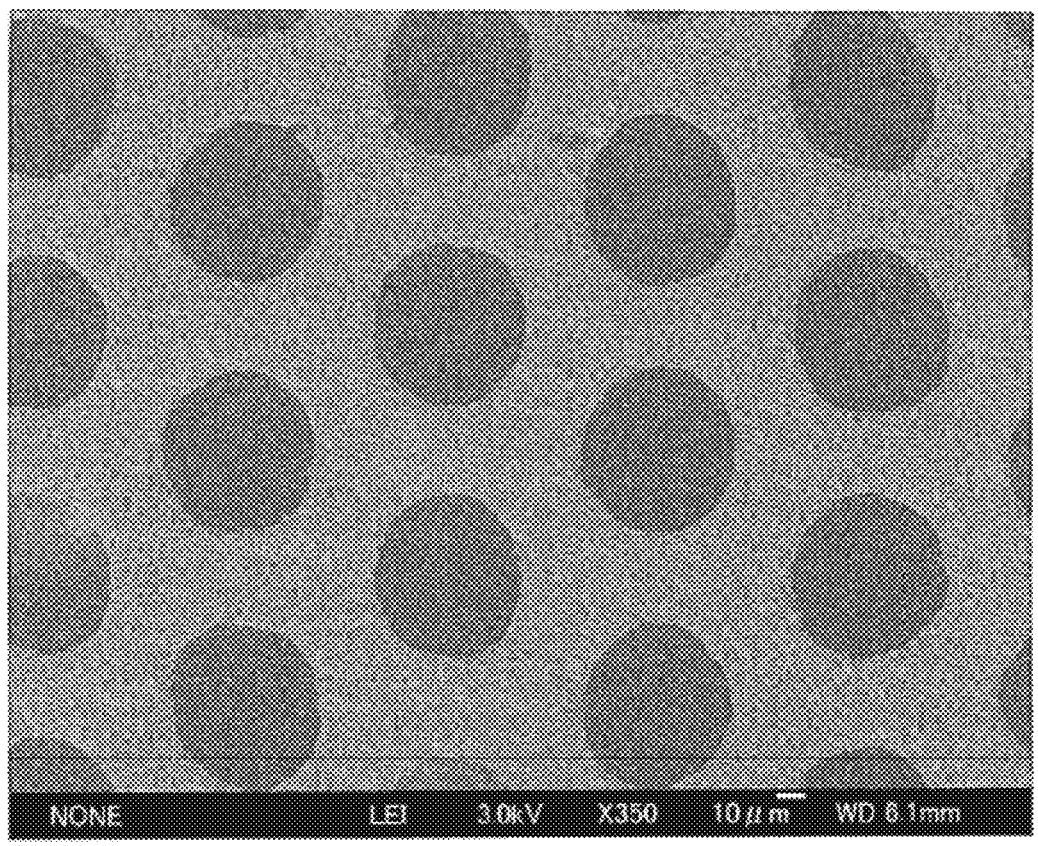
FIG. 5 is a SEM image of a substrate (punched metal, 26 μm thick, pore size Φ60 μm).
Figure 7:
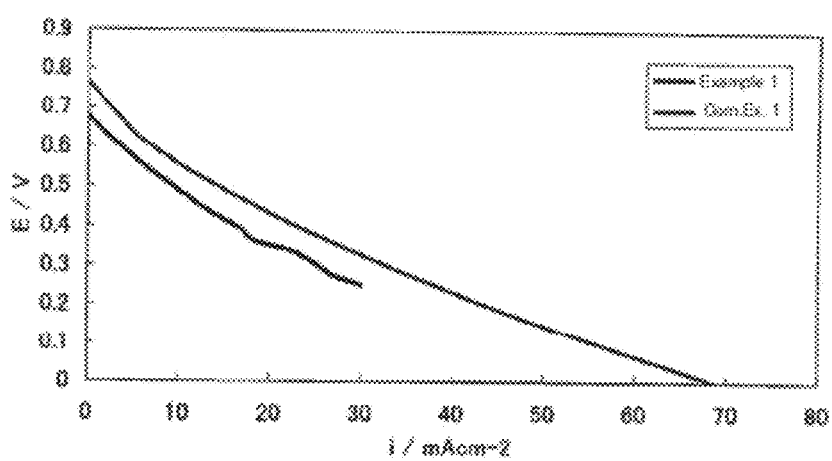
FIG. 7 is a graph showing the current-voltage characteristics of the fuel battery cells fabricated in Example 1 and Comparative Example 1.

A fuel battery cell was fabricated using punched metal (26 μm thick, pore size φ60 μm, porosity 32%) as a substrate, and subjected to an electricity generation test. A micrograph of the punched metal taken under a scanning electron microscope (manufactured by JEOL LTD., JSM-6300) is shown in FIG. 5. The thickness of the obtained solid electrolyte membrane (the total of the thicknesses of the electrolyte $NaCo_2O_4$ and the substrate) was 47 μm. While the temperature upon measurement of the part where the sample was mounted was kept at 75° C., the open circuit voltage (OCV) was measured. The result is shown in Table 1. A current-voltage curve at 75° C. is shown in FIG. 7.

Example 2

A fuel battery cell was fabricated using the same substrate as in Example 1 except that the thickness of the solid electrolyte membrane was 53 μm, and subjected to the electricity generation test. While the temperature upon measurement of the part where the sample was mounted was kept at 75° C., the open circuit voltage (OCV) was measured. The result is shown in Table 1.

Example 3

Example 1 was followed except that metal mesh (45 μm thick, pore size φ25 μm, porosity 25%) was used as the substrate, and the thickness of the solid electrolyte membrane (the total of the thicknesses of the electrolyte $NaCo_2O_4$ and the substrate) was 51 μm. While the temperature upon measurement of the part where the sample was mounted was kept at 75° C., the open circuit voltage (OCV) was measured. The result is shown in Table 1.

Example 4

Figure 6:
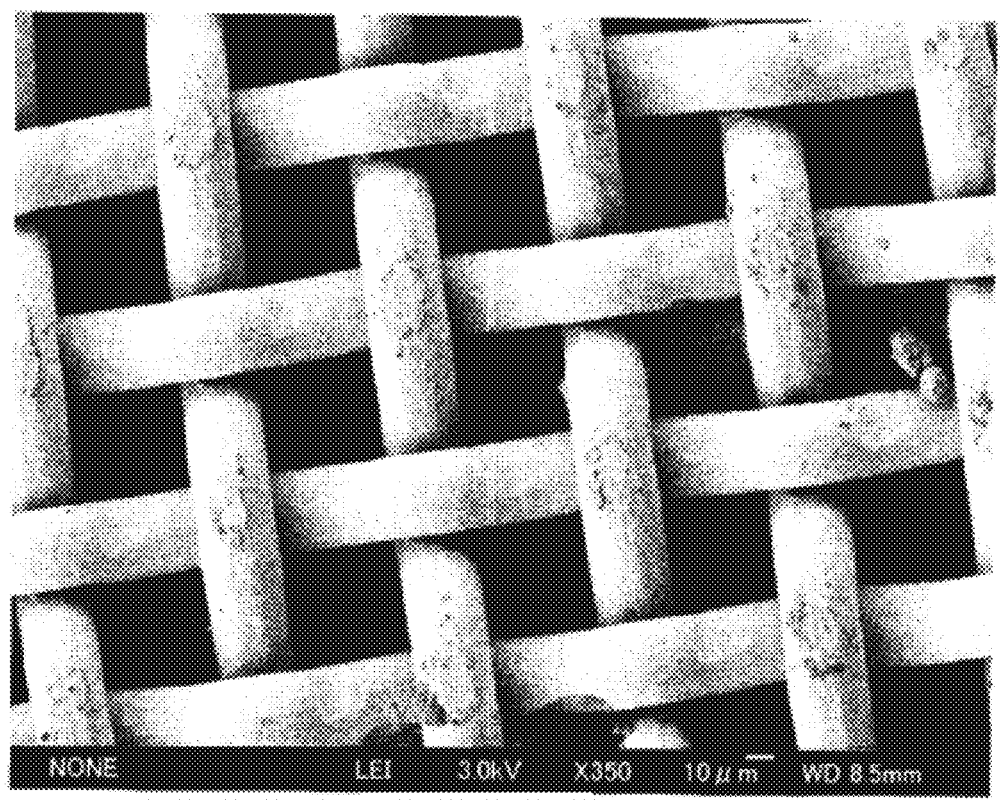
FIG. 6 is a SEM image of a substrate (metal mesh, 48 μm thick, pore size Φ38 μm).

Example 1 was followed except that metal mesh (48 μm thick, pore size φ38 μm, porosity 33%) was used as the substrate, and the thickness of the solid electrolyte membrane (the total of the thicknesses of the electrolyte $NaCo_2O_4$ and the substrate) was 78 μm. A SEM image of the metal mesh is shown in FIG. 6. While the temperature upon measurement of the part where the sample was mounted was kept at 75° C., the open circuit voltage (OCV) was measured. The result is shown in Table 1.

Example 5

Example 1 was followed except that metal mesh (69 μm thick, pore size φ54 μm, porosity 32%) was used as the substrate, and the thickness of the solid electrolyte membrane (the total of the thicknesses of the electrolyte $NaCo_2O_4$ and the substrate) was 80 μm. While the temperature upon measurement of the part where the sample was mounted was kept at 75° C., the open circuit voltage (OCV) was measured. The result is shown in Table 1.

Example 6

A fuel battery cell was fabricated using the same substrate as in Example 1 except that the electrolyte $NaCo_2O_4$ was replaced with an electrolyte $LaSr_3Fe_3O_{10}$, and the thickness of the solid electrolyte membrane (the total of the thicknesses of the electrolyte $LaSr_3Fe_3O_{10}$ and the substrate) was 69 μm, and subjected to the electricity generation test. While the temperature upon measurement of the part where the sample was mounted was kept at 75° C., the open circuit voltage (OCV) was measured. The result is shown in Table 1.

Comparative Example 1

Example 1 was followed except that the membrane cell was replaced with a $NaCo_2O_4$ pellet (electrolyte thickness 895 μm) prepared as follows. The result of the measurement of the open circuit voltage (OCV) is shown in Table 1. A current-voltage curve at 75° C. is shown in FIG. 7.

<Preparation of $NaCo_2O_4$ Pellet>

A $NaCo_2O_4$ pellet was prepared according to the following method, which is the same as the preparation (1) to (5) of electrolyte $NaCo_2O_4$ discussed above, except for final molding into a pellet. The powder obtained by the above method was formed into a pellet (10 mm in diameter, 1.7 to 12 mm thick) in a tablet mold. In this case, when the thickness of a pellet was not more than 6 mm, the powder was molded at a pressure of 30 MPa for a holding time of 5 minutes, and when the thickness of a pellet was about 12 mm, at a pressure of 40 MPa for a holding time of 5 minutes. The resulting molded body was placed in a muffle furnace, and sintered at a temperature of 900° C. for a holding time of 32 hours in the air, to thereby obtain a $NaCo_2O_4$ sintered body.

TABLE 1

|  | Form | Electrolyte | Average pore size (μm) | Average substrate thickness (μm) | Substrate porosity (%) | Electrolyte thickness (μm) | Open circuit voltage (V) |
|---|---|---|---|---|---|---|---|
| Example 1 | thin film | $NaCo_2O_4$ | 60 | 26 | 32 | 47 | 0.765 |
| Example 2 | thin film | $NaCo_2O_4$ | 60 | 26 | 32 | 53 | 0.760 |
| Example 3 | thin film | $NaCo_2O_4$ | 25 | 45 | 25 | 51 | 0.756 |
| Example 4 | thin film | $NaCo_2O_4$ | 38 | 48 | 33 | 78 | 0.738 |
| Example 5 | thin film | $NaCo_2O_4$ | 54 | 69 | 32 | 80 | 0.723 |
| Example 6 | thin film | $LaSr_3Fe_3O_{10}$ | 60 | 26 | 32 | 69 | 1.08 |
| Comp. Ex. 1 | pellet | $NaCo_2O_4$ | — | — | — | 895 | 0.680 |

Example 7

Figure 8:
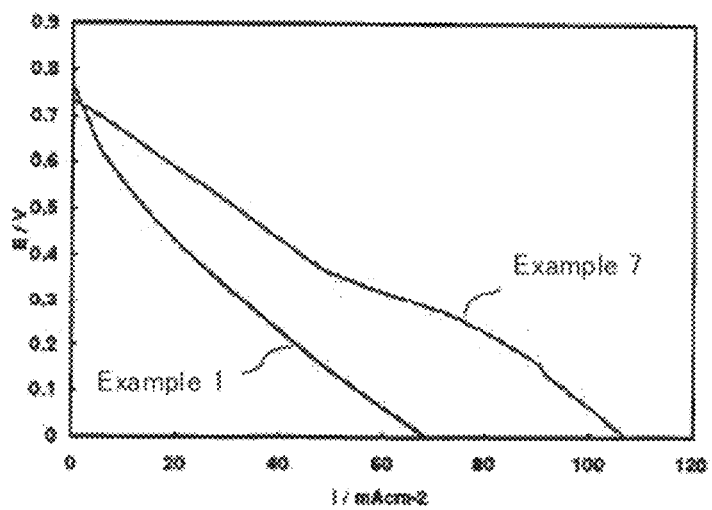
FIG. 8 is a graph showing the current-voltage characteristics of the fuel battery cells fabricated in Examples 1 and 7.

A fuel battery cell was fabricated using the same substrate as in Example 1 except that the thickness of the solid electrolyte membrane (the total of the thicknesses of the electrolyte $NaCo_2O_4$ and the substrate) was made 102 μm by applying the slurry twice by doctor-blading in the fabrication of the fuel battery cell, and the cell was subjected to the electricity generation test. A current-voltage curve at 75° C. is shown in FIG. 8. As a reference, the current-voltage curve shown in FIG. 7 of the fuel battery cell fabricated in Example 1 is also shown together in FIG. 8.

The density of the solid electrolyte layer prepared in Example 7 and of the solid electrolyte layer prepared in Example 1 was determined in accordance with the following formula:

Density(g·cm$^{-3}$)=(Overall Mass of Solid Electrolyte Membrane−Substrate Mass)/(Overall Volume of Solid Electrolyte Membrane−Substrate Volume).

The result is that the density of the solid electrolyte layer of Example 1 was 3.1 g·cm$^{-3}$, and the density of the solid electrolyte layer of Example 7 was 3.3 g·cm$^{-3}$, that is, the solid electrolyte layer of Example 7 with the two times of application had improved denseness. In addition, with the larger thickness of the solid electrolyte layer in Example 7, cross-leakage was inhibited, and as a whole, the voltage drop was further inhibited as shown in FIG. 8.

Example 8

Figure 9:
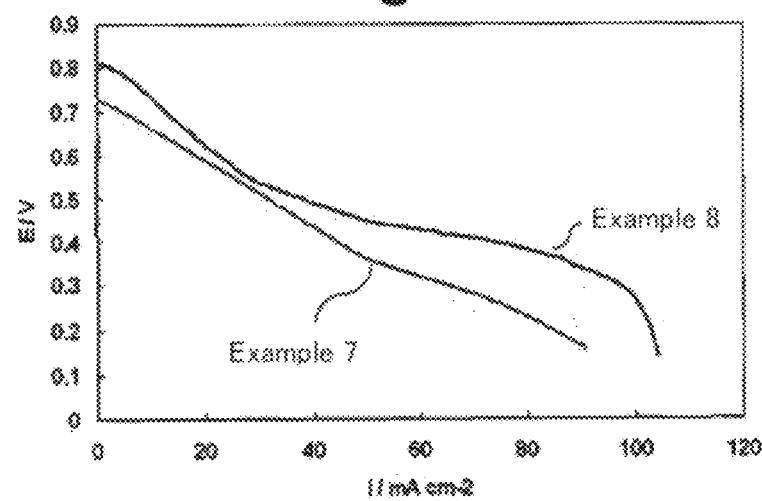
FIG. 9 is a graph showing the current-voltage characteristics of the fuel battery cells fabricated in Examples 7 and 8.

A fuel battery cell was fabricated using the same substrate as in Example 1 except that the slurry was additionally sprayed onto the solid electrolyte layer prepared in Example 7 so that the total of the thicknesses of the electrolyte $NaCo_2O_4$ and the substrate was 112 μm, and also the solid electrolyte layer 3 on the cathode side in FIG. 4 was overlaid with a carbon paper (AvCarb P50T, manufactured by Ballard Power Systems Inc.) for the electricity generation test to make the thickness of the solid electrolyte membrane (the total of the thicknesses of the electrolyte $NaCo_2O_4$, the substrate, and the carbon paper) 156 μm. The cell was subjected to the electricity generation test. A current-voltage curve at 75° C. is shown in FIG. 9. As a reference, the current-voltage curve shown in FIG. 8 of the fuel battery cell fabricated in Example 7 is also shown together in FIG. 9.

DESCRIPTION OF REFERENCE SIGNS

1: substrate; 1a: opening; 3: solid electrolyte layer; 4, 5: catalyst layer; 10A, 10B: solid electrolyte membrane; 20A, 20B: fuel battery cell; 30: fuel battery

What is claimed is:

1. A fuel battery cell comprising a solid electrolyte membrane and a catalyst layer comprising a precious metal,
    wherein said solid electrolyte membrane comprises a substrate made of a sheet material and having a plurality of openings penetrating the substrate in its thickness direction, and a solid electrolyte layer,
    wherein the solid electrolyte layer is provided on one of the faces of said substrate, and the catalyst layer is provided on the other of the faces of said substrate, with the solid electrolyte layer and the catalyst layer being in contact with each other in the openings of said substrate.

2. The fuel battery cell according to claim 1, wherein said catalyst layer comprises at least one metal oxide selected from the group consisting of $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, and $Sr_4Co_{1.6}Ti_{1.4}O_8(OH)_2 \cdot xH_2O$, and carries said precious metal.

3. A method for producing the fuel battery cell according to claim 1, comprising the step of:
    preparing a first slurry comprising solid electrolyte powder, a binder, and a solvent;
    preparing a second slurry comprising precious metal-carrying catalyst powder and a solvent;
    applying said first slurry to one of the faces of a substrate made of a sheet material and having a plurality of openings penetrating the substrate in its thickness direction so that said slurry fills said openings at least partly;
    drying and/or baking the substrate with the first slurry applied to form a solid electrolyte layer on said one of the faces;
    applying said second slurry to the other of the faces of the substrate without the solid electrolyte layer; and
    drying and/or baking the substrate with the second slurry applied to form a catalyst layer on said the other of the faces to give the fuel battery cell.

4. The method according to claim 3 further comprising the step of pressing, after the step to form a solid electrolyte layer and/or the step to form a catalyst layer.

5. A fuel battery comprising a fuel battery cell according to claim 1.

6. A fuel battery comprising a fuel battery cell according to claim 2.

7. The method according to claim 3, wherein said solid electrolyte powder comprises at least one metal oxide selected from the group consisting of $NaCo_2O_4$, $LaFe_3Sr_3O_{10}$, $Bi_4Sr_{14}Fe_{24}O_{56}$, $NaLaTiO_4$, $RbLaNb_2O_7$, $KLaNb_2O_7$, and $Sr_4Co_{1.6}Ti_{1.4}O_8(OH)_2 \cdot xH_2O$.

* * * * *